(12) United States Patent
Mary et al.

(10) Patent No.: US 6,431,081 B2
(45) Date of Patent: Aug. 13, 2002

(54) METHOD AND APPARATUS FOR VENTILATING ELECTRICAL EQUIPMENT ON BOARD A RAIL VEHICLE

(75) Inventors: Bernard Mary, Mont Ferrand le Chateau; Gilles Liévremont, Ornans, both of (FR)

(73) Assignee: Alstom, Paris (FR)

( * ) Notice: Subject to any disclaimer, the term of this patent is extended or adjusted under 35 U.S.C. 154(b) by 0 days.

(21) Appl. No.: 09/840,021

(22) Filed: Apr. 24, 2001

(30) Foreign Application Priority Data

May 4, 2000 (FR) .............................. 00 05746

(51) Int. Cl.$^7$ ................................. B61C 3/00
(52) U.S. Cl. ............................. 105/59; 191/4
(58) Field of Search .................... 105/59; 318/773, 318/812; 310/63; 191/4, 5, 7

(56) References Cited

U.S. PATENT DOCUMENTS

| 2,082,230 A | * | 6/1937 | Stout et al. ..................... 105/59 |
| 2,164,444 A | * | 7/1939 | Blomberg ..................... 105/59 |
| 4,019,108 A | * | 4/1977 | Elvin ......................... 318/139 |
| 4,795,859 A | * | 1/1989 | Kato et al. ..................... 191/4 |
| 4,831,294 A | | 5/1989 | Jussila ........................ 310/63 |
| 4,907,645 A | * | 3/1990 | Dumas et al. ................. 105/59 |
| 4,978,894 A | * | 12/1990 | Takahara ..................... 318/811 |
| 5,347,442 A | * | 9/1994 | Henmi et al. ................. 363/41 |
| 5,735,215 A | * | 4/1998 | Tegeler ....................... 105/34.1 |
| 6,066,935 A | * | 5/2000 | Eisele ......................... 318/773 |
| 6,072,291 A | * | 6/2000 | Pedersen .................... 318/812 |

FOREIGN PATENT DOCUMENTS

| DE | 32 31 152 | 8/1983 | ............ H02K/9/04 |
| EP | 0 073 846 | 3/1983 | ............ H02P/7/62 |

* cited by examiner

Primary Examiner—Lars Olson
(74) Attorney, Agent, or Firm—Sughrue Mion, PLLC

(57) ABSTRACT

Apparatus for ventilating electrical equipment on board a rail vehicle, said rail vehicle being powered with DC either directly by an electricity pick-up system connected to a DC source, or indirectly by rectifying and filtering electricity picked up by an electricity pick-up system connected to a single-phase AC source, each piece of electrical equipment being ventilated by a respective cooling fan controlled by an electric motor, wherein the electric motors are asynchronous motors, each fan electric motor being powered with three-phase AC by an individual converter connected to the DC for powering the rail vehicle.

7 Claims, 1 Drawing Sheet

METHOD AND APPARATUS FOR VENTILATING ELECTRICAL EQUIPMENT ON BOARD A RAIL VEHICLE

The invention relates to a method and apparatus for ventilating electrical equipment on board a DC-powered rail vehicle, and more particularly to ventilation apparatus including, for each piece of electrical equipment, an associated fan controlled by an electric motor. The ventilation apparatus preferably applies to rail traction vehicles, such vehicles having many pieces of ventilated electrical equipment on board.

BACKGROUND OF THE INVENTION

Normally, each piece of power equipment in a power car, such as transformers, traction motors, braking rheostats, and electronic power units, are individually cooled, each by means of a respective fan driven by an electric motor, all of the motors being powered with electricity by the same converter, on board the car, that transforms the DC available at the catenary into AC suitable for operating power equipment. However, such ventilation apparatus has the drawback of causing the various fans to operate collectively. Thus, as soon as any one of the fans is required to operate at full power in order to ensure that the electrical equipment associated therewith is cooled, then the converter also powers the other fans at full power, thereby causing an unnecessary increase in the amount of power consumed, and generating additional noise pollution.

OBJECT AND SUMMARY OF THE INVENTION

The object of the present invention is thus to propose a method and apparatus for ventilating electrical equipment on board a rail vehicle, thereby making the rail vehicle more comfortable by reducing noise pollution, and also reducing the amount of power it consumes.

The invention proposes apparatus for ventilating electrical equipment on board a rail vehicle, said rail vehicle being powered with DC either directly by an electricity pick-up system connected to a DC source, or indirectly by rectifying and filtering electricity picked up by an electricity pick-up system connected to a single-phase AC source, each piece of electrical equipment being ventilated by means of a respective cooling fan controlled by an electric motor, wherein the electric motors are asynchronous motors, each fan electric motor being powered with three-phase AC by an individual converter connected to the DC for powering the rail vehicle.

The apparatus of the invention for ventilating on-board electrical equipment can also include one or more of the following characteristics taken in isolation or in any technically feasible combination:

- the individual converter is integrated on the stand of the motor of said fan;
- each fan power converter is controlled as a function of the power consumed by the associated electrical equipment; and
- the rail vehicle is a car including electrical power equipment such as transformers, traction motors, braking rheostats, or electronic power units.

The invention also relates to a method of ventilating electrical equipment on board a DC-powered rail vehicle, each piece of electrical equipment being ventilated by means of a respective cooling fan controlled by an electric motor, wherein each fan electric motor is independently powered with three-phase AC by means of an individual converter connected to the DC for powering the rail vehicle, the converter being controlled as a function of the power consumed by the associated electrical equipment.

In another characteristic of the method of the invention, each converter is controlled so that cooling of the associated electrical equipment is proportional to the power consumed by the electrical equipment.

BRIEF DESCRIPTION OF THE DRAWING

The objects, characteristics, and advantages of the present invention will be better understood on reading the following description of an embodiment of the invention, given by way of non-limiting example, and with reference to the accompanying drawing, in which.

MORE DETAILED DESCRIPTION

Figure 1:
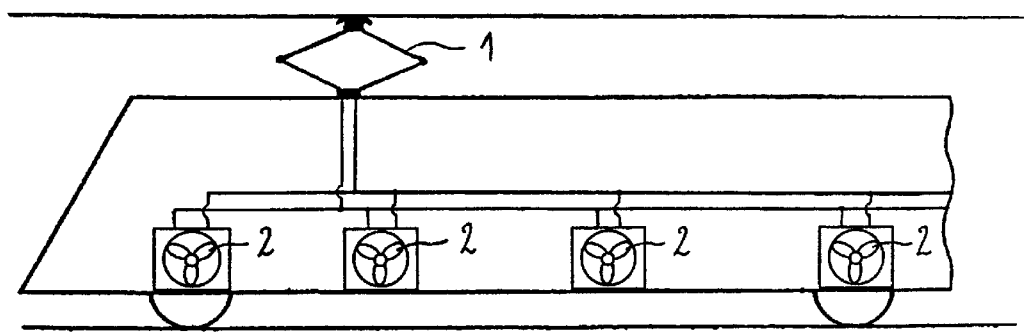
FIG. 1 is a diagrammatic side view of a rail vehicle fitted with apparatus of the invention for ventilating on-board electrical equipment.

To make the drawing easier to understand, only the elements necessary for understanding the invention are shown.

FIG. 1 shows a rail vehicle power car that is electrically powered by means of a pantograph device 1 connected to a catenary supplying 750V DC.

In FIG. 1, the carriage is fitted with electrical equipment of the traction motor, transformer, electronic power unit, and braking rheostat type, each piece of equipment including a respective cooling fan 2 driven by an asynchronous electric motor 3.

Figure 2:
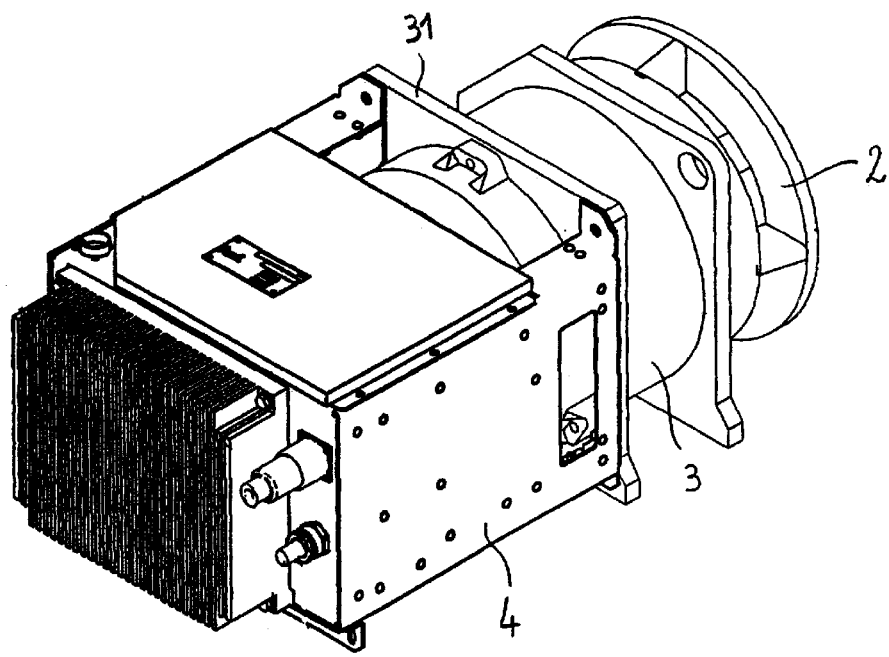
FIG. 2 is a perspective view of a fan motor integrating a converter used in the ventilation apparatus of the invention.

In FIG. 2, a DC/AC converter 4 is integrated on the stand of each asynchronous motor 3 so as to transform the 750V DC from the catenary into three-phase AC powering the asynchronous motor 3. The converter 4 is fixed by screws onto a collar 31 of the stand of the electric motor 3, thus providing a compact assembly, comprising a converter 4, a motor 3, and a fan 2.

The converter 4 is made up of IGBTs and delivers a modulatable output frequency f, at a constant $U_{out}/f_{out}$ ratio, up to a fundamental output voltage $U_{out}$=545 v for a frequency $f_{out}$=50 Hz. The winding of each electric motor 3 is dimensioned to function directly at the fundamental output voltage of the converters, i.e. 545 V at 50 Hz.

Each converter 4 includes a control circuit receiving, as an input parameter, the electric current consumed by the electrical equipment to be ventilated.

The ventilation apparatus of the invention operates as follows:

When a piece of electrical equipment is operating, the motor 3 of the cooling fan 2 associated therewith is powered with AC by the integrated converter 4, said converter relying on the reading of the electric current consumed by the electrical equipment in order to power the electric motor 3 proportionally so that the speed of rotation of the fan 2 is proportional to the power consumption of the associated electrical equipment.

Such ventilation apparatus with asynchronous motors for driving fans has the advantage of having a lifetime and a reliability that are greater than apparatuses with DC motors, while requiring less maintenance. In addition, the presence of an integrated converter at each fan motor enables the power of each fan to be varied individually as a function of the electrical power consumed by the electrical equipment, and thus of the heat given off by said electrical equipment.

Consequently, the ventilation apparatus of the invention enables the ventilation of each piece of electrical equipment to be adapted as a function of its cooling needs, and thus enables power consumption to be reduced considerably. In addition, by enabling the fans of the electrical equipment to be controlled individually, the ventilation apparatus and method of the invention also have the advantage of limiting the operating time of the fans, thus reducing the noise pollution emitted by said fans, and thus providing greater comfort for passengers.

What is claimed is:

1. Apparatus for ventilating a plurality of pieces of electrical equipment on board a rail vehicle, said rail vehicle being powered with DC either directly by an electricity pick-up system connected to a DC source, or indirectly by rectifying and filtering electricity picked up by an electricity pick-up system connected to a single-phase AC source, each of said pieces of electrical equipment being ventilated by a respective cooling fan controlled by an electric motor, wherein the electric motors are asynchronous motors, each fan electric motor being powered with three-phase AC by an individual converter connected to the DC for powering the rail vehicle.

2. Ventilation apparatus according to claim 1, wherein said individual converter is integrated on a stand of the motor of said fan.

3. Apparatus according to claim 2, wherein each fan power converter is controlled as a function of the power consumed by an associated one of said pieces of electrical equipment.

4. Apparatus according to claim 1, wherein said rail vehicle is a car and said electrical equipment comprises electrical power equipment.

5. Apparatus according to claim 4, wherein said electrical power equipment comprises at least one of transformers, traction motors, braking rheostats, and electronic power units.

6. A method of ventilating a plurality of pieces of electrical equipment on board a DC-powered rail vehicle, each of said pieces of said electrical equipment being ventilated by a respective cooling fan controlled by an electric motor, wherein the electric motors are asynchronous motors, each fan electric motor being independently powered with three-phase AC by an individual converter connected to the DC for powering the rail vehicle, said individual converter being controlled as a function of the power consumed by an associated one of said pieces of electrical equipment.

7. A ventilation method according to claim 6, wherein each converter is controlled so that cooling of the associated piece of electrical equipment is proportional to the power consumed by the associated piece of electrical equipment.

* * * * *